United States Patent [19]

Chelminski

[11] Patent Number: 4,723,230
[45] Date of Patent: Feb. 2, 1988

[54] HIGH AMBIENT LIQUID PRESSURE-RESISTANT ELECTRICAL CONNECTOR

[75] Inventor: Stephen V. Chelminski, West Redding, Conn.

[73] Assignee: Bolt Technology Corporation, Norwalk, Conn.

[21] Appl. No.: 896,395

[22] Filed: Aug. 13, 1986

[51] Int. Cl.[4] .............................................. G01V 1/38
[52] U.S. Cl. ...................................... 367/20; 367/144; 181/110; 439/201; 439/272
[58] Field of Search ................ 367/20, 106, 130, 144; 181/110, 118, 120; 339/115 R, 115 C

[56] References Cited

U.S. PATENT DOCUMENTS

| | | | |
|---|---|---|---|
| 4,390,229 | 6/1983 | Chevalier | 339/115 R |
| 4,509,691 | 4/1985 | Skinner | 239/533.9 |
| 4,594,696 | 6/1986 | Lien et al. | 367/144 |

Primary Examiner—Charles T. Jordan
Assistant Examiner—John W. Eldred
Attorney, Agent, or Firm—Parmelee, Bollinger & Bramblett

[57] ABSTRACT

A high ambient liquid pressure-resistant electrical connector is shown with an airgun having a solenoid actuated valve mounted on the airgun. A multi-conductor electrical cable is connected by this pressure-resistant connector to a plurality of terminals of the solenoid valve for protecting from ambient liquid the terminals and the adjacent portions of the conductors. This pressure-resistant electrical connector includes a connector housing having an upper end and a lower end, with the lower end of the housing being mounted to the airgun. The connector housing has a fluid sealant chamber for enclosing the electrical terminals and adjacent portions of the conductors connected to the terminals and includes at least one barrier for engaging the cable to protect against ambient liquid seeping past the barrier to the electrical terminals. The connector housing defines a cylindrical space carrying a spring-loaded piston. The inner end of this cylindrical space communicates with the liquid sealant chamber, and the outer end is exposed to the ambient liquid for applying ambient pressure to the piston for urging the piston away from the outer end of the cylindrical space toward the inner end. The fluid sealant chamber and the inner end of the cylindrical space are filled with waterproof sealant fluid material, for example such as waterproof grease. Thus, ambient liquid pressure plus the pressure resulting from spring force on the piston is applied to the waterproof sealant fluid material filling the sealant chamber enclosing the terminals and adjacent portions of the conductors. Consequently, this sealant material is always at a pressure exceeding the pressure of ambient liquid for preventing ambient liquid from seeping into the chamber enclosing the terminals. A second sealant chamber containing fluid sealant material similarly maintained at pressure exceeding ambient pressure is shown surrounding the end of the cable sheath where the conductors exit from the cable sheath for preventing seepage of ambient fluid within the cable sheath around the conductors.

12 Claims, 8 Drawing Figures

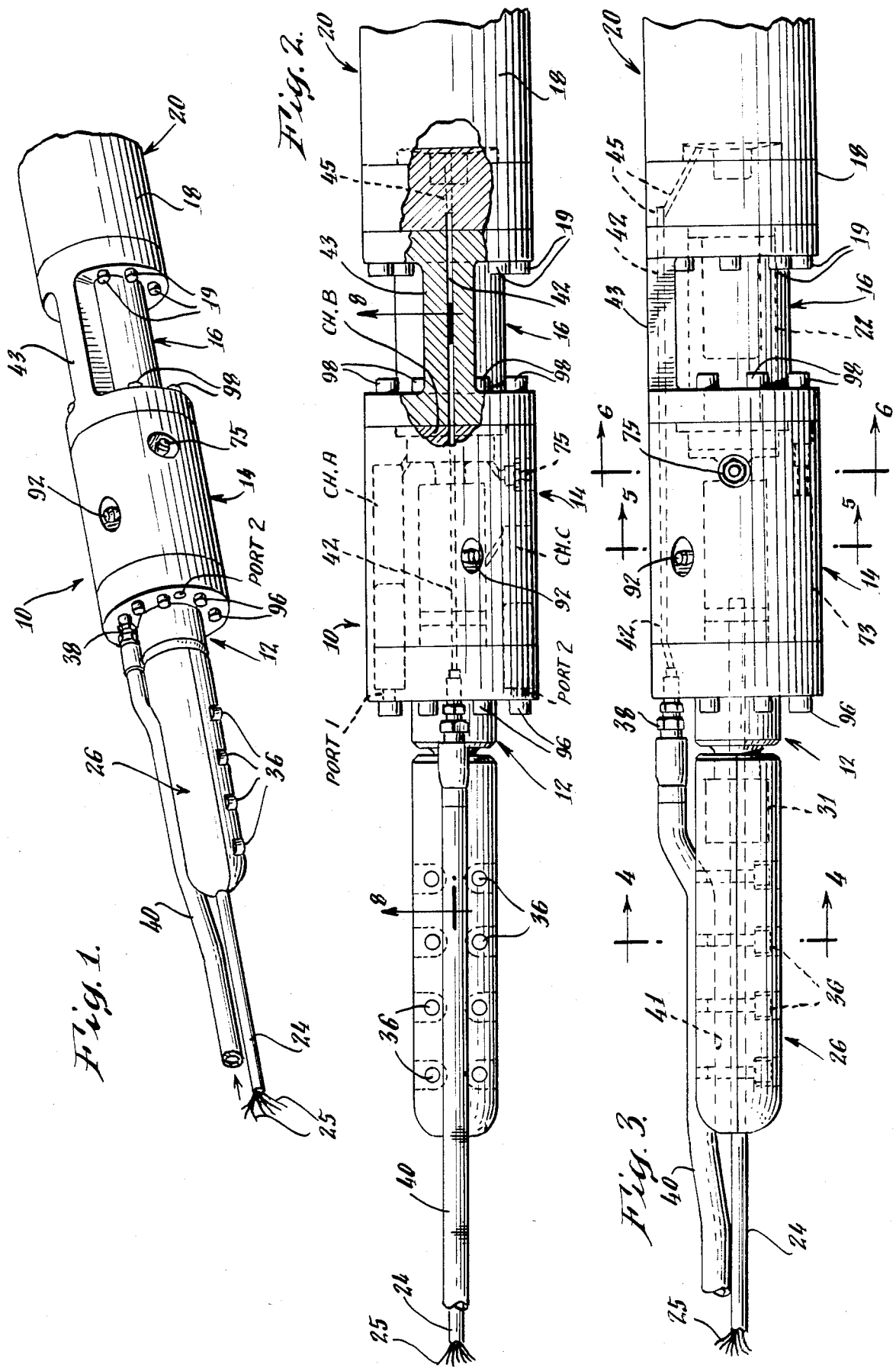

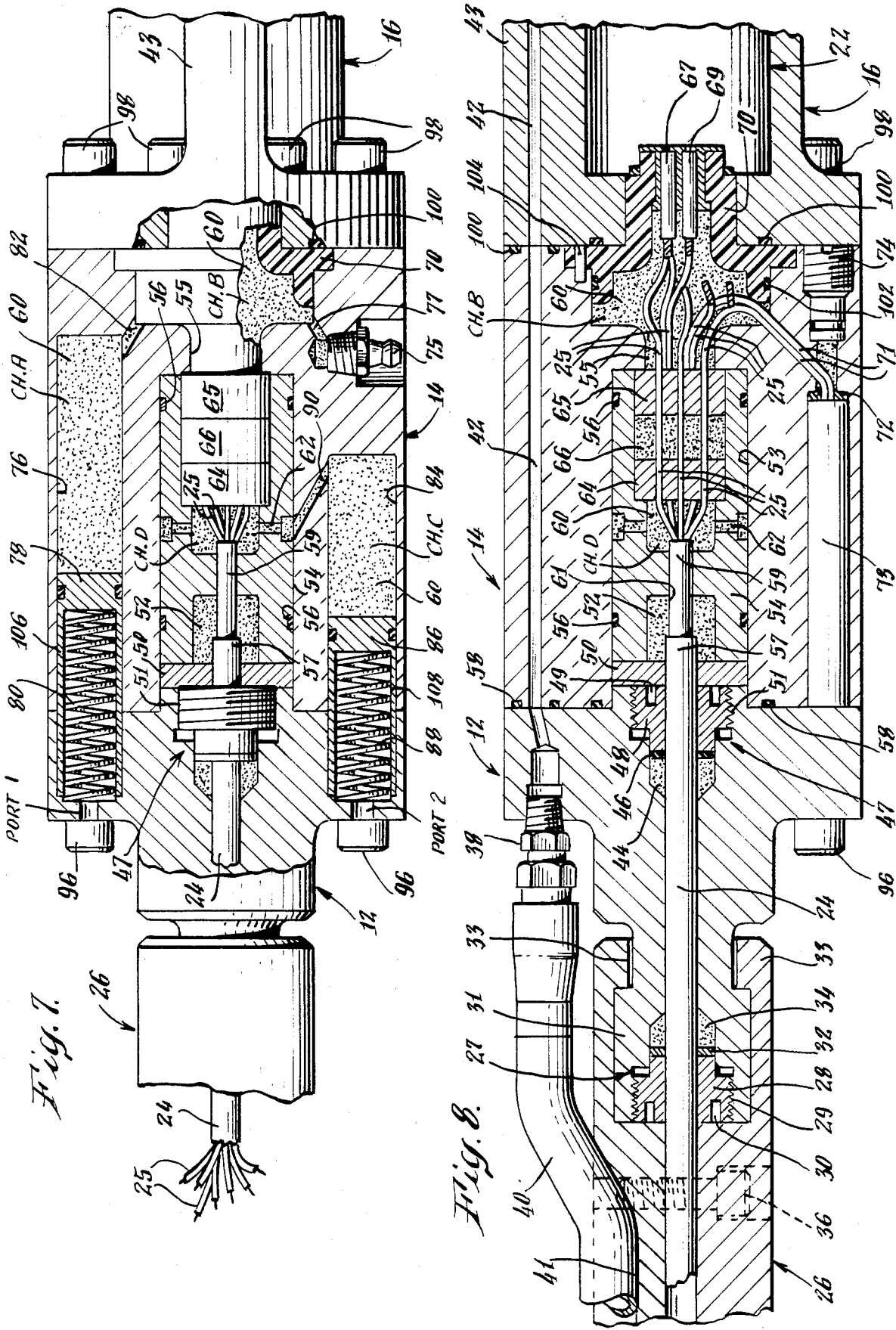

… …

HIGH AMBIENT LIQUID PRESSURE-RESISTANT ELECTRICAL CONNECTOR

BACKGROUND

This invention relates to a high ambient liquid pressure-resistant electrical connector for connecting a solenoid actuated valve having a plurality of terminals to a multi-conductor electrical cable for use with an airgun lowered down into ambient liquid in a well, wherein the electrical connector may be subjected to high ambient liquid pressures.

In accord with new seismic surveying techniques, powerful impulses are generated underground in liquid in boreholes and are utilized to investigate subsurface geological conditions and formations. The powerful impulses are generated by pressurized gas discharging apparatus referred to as airguns which are fired when the highly pressurized gas is caused to be abruptly released or discharged from the airgun into the surrounding environment. Firing of the airgun is accomplished by the actuation of a solenoid valve for causing flow of pressurized gas through a passageway in the airgun, and this valve is actuated by sudden electrical energization through conductors in an electrical cable.

The integrity of the electrical connections must be maintained in difficult environmental conditions where liquid pressures deep in a borehole are extremely high. The advent of ever increasing depths of drilling in order to find new sources of petroleum increases the problem. If liquids leak or seep into the regions where the electrical terminals of the solenoid valve are connected to the electrical conductors of the cable, such connections may become short circuited or disrupted, thus causing expensive interruption of the seismic surveying.

SUMMARY OF THE DISCLOSURE

Accordingly, it is an object of this invention to provide a new and improved high ambient liquid pressure-resistant electrical connector for an airgun which prevents liquids from leaking or seeping into the regions where electrical connectors for connecting the cable to the airgun are located.

Another object of this invention is to provide a new and improved cable connector assembly for an airgun which is suitable to be lowered down deep into wells where liquid pressures are extremely high.

Still a further object of this invention is to provide a new and improved high ambient liquid pressure-resistant electrical connector for use with various types of equipment in well logging operations and other environments which is simple in construction, easy to assemble and disassemble, and which will conveniently fit into small size boreholes.

Another object of this invention is to provide a new and improved logging cable connector assembly which provides continuous protection against liquids seeping into regions where the electrical terminals and electrical connectors are located in the assembly regardless of the depths of the borehole to which the assembly is lowered.

In carrying out this invention in one illustrative embodiment thereof, a high ambient liquid pressure-resistant electrical connector is provided which connects a plurality of electrical conductors of an electrical cable to a plurality of terminals of a solenoid valve mounted on an airgun. A connector housing has a lower end and an upper end, with the lower end being mounted to an airgun. Cable clamp means are associated with the upper end of the connector for encircling the electrical cable near an end of the cable from which extend a plurality of electrical conductors attached to respective terminals of the solenoid valve of the airgun. The cable clamp means includes gripping means for providing a mechanical grip on the electrical cable encircled by the clamp means. The connector housing defines a fluid sealant chamber for enclosing the electrical terminals and adjacent portions of the respective conductors connected to the terminal. The conductor housing includes at least one barrier means for engaging the cable and being positioned between the first fluid sealant chamber and the cable clamp means. The barrier means engages the cable for providing a barrier against ambient liquid seeping past the barrier towards the electrical terminals. A cylinder space is defined in the connector housing having an inner end communicating with the fluid sealant chamber and an outer end in communication with a port of the connector housing exposed to the ambient thereby subjecting the outer end of the cylinder to ambient pressure. A movable piston is mounted in the cylinder space and has a force applying means coupled thereto for applying a continuous force for urging the piston toward the inner end of the cylinder space along with the force of ambient pressure acting on the piston. The fluid sealant chamber is provided with filling means communicating therewith and with the inner end of the cylinder space for filling the fluid sealant chamber and the inner end of the cylinder space with a waterproof fluid sealant. The water-proof fluid sealant is thus under ambient pressure plus additional pressure resulting from the continous force on the piston for enabling the fluid sealant under this additional pressure to resist seepage of ambient liquid into the fluid sealant chamber enclosing the terminals and adjacent portions of the respective conductors connected thereto.

A second sealant chamber containing fluid sealant material similarly maintained at a pressure exceeding ambient pressure is shown surrounding the end of the cable sheath where the electrical conductors exit from the cable sheath for preventing the seepage of ambient liquid within the cable sheath around the conductors.

BRIEF DESCRIPTION OF THE DRAWINGS

The invention, together with further objects, aspects, advantages and features thereof will be more clearly understood from the following description taken in connection with the accompanying drawings in which like elements will bear the same reference numerals throughout the various views.

FIG. 1 is a perspective view of the logging cable connector assembly in accordance with the present invention.

FIG. 2 is an enlarged top view of FIG. 1 with certain parts broken away.

FIG. 3 is a side elevational view of FIG. 2.

FIG. 7 is an enlarged axial sectional view taken along line 7—7 of FIG. 4.

FIG. 8 is a similarly enlarged axial sectional view taken along line 8—8 of FIG. 2.

DESCRIPTION OF THE PREFERRED EMBODIMENTS

Figure 4:
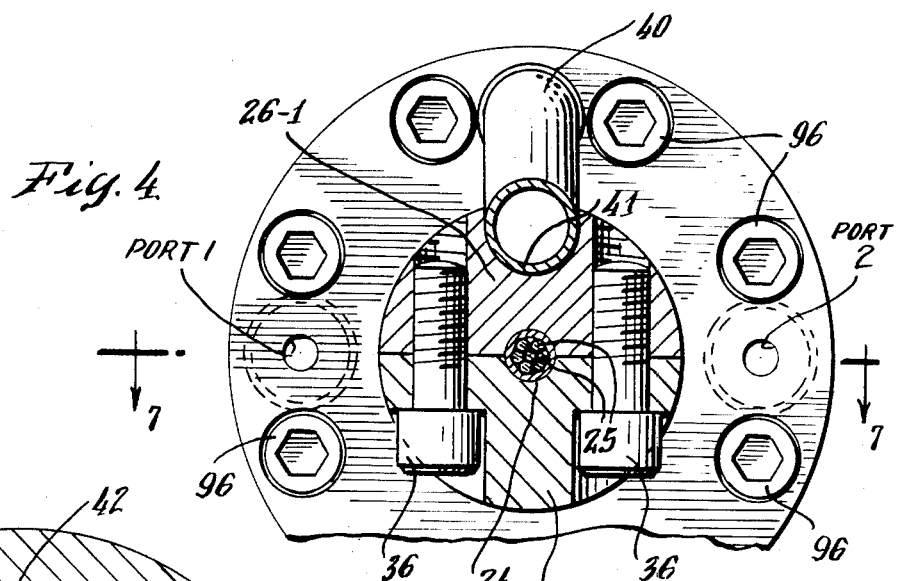
FIG. 4 is a cross-sectional view taken along line 4—4 of FIG. 3 and shown enlarged.

Referring now to FIG. 1, the high ambient liquid pressure-resistant electrical cable connector assembly in accordance with the present invention is referred to generally by reference numeral 10 and includes an upper housing 12, an intermediate housing 14, and a lower housing 16 attached by machine screws 19 to a top airgun housing 18 of a cylindrical airgun 20. Only the upper end portion 18 of the airgun 20 is shown because the airgun itself may be conventional. The lower connector housing 16 has a solenoid valve 22 mounted therein for use in firing the airgun 20. Since the airgun 20 and solenoid valve 22 are conventional they will not be further described, and for detailed information about them, reference may be made to U.S. Pat. Nos. 3,379,273; 3,653,460; 3,808,822; 3,997,021; 3,271,924 and 4,472,794.

A multiple conductor electrical cable 24 is led to the cable connector assembly 10 through a cable clamp 26 associated with the upper connector housing 12. As will best be seen in FIG. 8, an upper end portion 31 of the upper connector housing 12 includes a first gasket seal arrangement 27 comprising a locking nut 28 having spanner-wrench sockets 30 therein, a washer 32 and a cable gasket barrier 34 surrounding the outside diameter of the cable sheath. Tightening the nut 28 in its threaded socket 29 in the upper housing end portion 31 causes the gasket 34 to jam snuggly around the outside diameter of the cable sheath.

The cable clamp 26 is split longitudinally and is fastened together around the cable 24 by machine screws 36 for gripping the cable. The lower end of the cable clamp 26 embraces the upper housing end portion 31, as seen in FIG. 8, in attached relation thereto by inturned shoulders 33. Thus, the electrical cable 24 runs longitudinally through the cable clamp 26 and through the gasket seal arrangement 27 into the upper housing 12.

A high pressure air supply hose 40 is connected through the connector assembly 10 to the airgun 20 for supplying the airgun with high pressure compressed air. This high pressure hose is attached by a hose fitting 38 and supplies a passage 42 extending longitudinally through the connector assembly 10 as will best be seen in FIGS. 3 and 8. The lower housing 16 of the connector assembly 10 includes a longitudinally extending external flange 43 for the purpose of containing the pressurized air supply passageway 42 which extends directly to an air supply passage 45 (FIG. 3) in the airgun top housing 18, thereby supplying the airgun 20 with high pressure compressed air. It is to be noted from FIG. 3 that the longitudinal external flange 43 enables the air supply passage 42 to extend past the solenoid valve 22.

The intermediate connected housing 14 (FIG. 4) is provided with "PORTS" 1 and 2 which will be explained more in detail hereafter for subjecting certain elements of the connector assembly 10 to ambient pressure. FIG. 4 includes a cross-section of the two halves 26-1 and 26-2 of the cable clamp 26 secured onto the cable 24 in gripping relationship by machine screws 36. The high pressure hose 40 extends along the outside of the cable clamp 26 in a channel 41.

The electrical cable 24 enters into the upper connector housing 12 through the gasket seal arrangement 27 as explained above. The cable 24 exits from the upper housing 12 (Please see FIG. 8) through a second gasket seal arrangement 47 comprising gasket barrier 44 which surrounds the outside diameter of the cable 24, a washer 46 and a locking nut 48 having spanner-wrench sockets 49 therein and screwed into a threaded socket 51. The cable 24 continues through a connector housing washer 50 and through a center gasket barrier 52 in a wire insert holder 54 which is provided with O-ring seals 56 and seats in an axial bore 53 in the intermediate connector housing 14. This axial bore 53 terminates at an internal annular shoulder 55 which serves to position the wire holder insert 54. The juncture of upper housing 12 and connector housing 14 is also provided with a plurality of O-ring seals 58 for preventing ambient liquids from entering the connector 10. The outer sheath 57 of the cable 24 is ended within the gasket barrier 52 in the wire insert holder 54. The inner cable sheath 59 extends through an axial passage 61 in the wire insert holder 54 and enters a fluid sealant chamber D. The inner cable sheath 59 is terminated in this sealant chamber D in the wire insert holder 54 which is filled with waterproof fluid sealant material 60, for example waterproof silicone grease, through a passage 62 leading into chamber D as will be explained later. The individual conductors 25 of the cable 24 surrounded by waterproof sealant 60 in this chamber D pass through a pair of wire inserts 64 and 65 having a gasket barrier 66 sandwiched therebetween for accommodating seven insulated conductors 25.

Two pairs of these conductors 25 are connected to terminals 67, 69 of the solenoid valve 22 for firing the airgun 20. Two of these conductors 25 are joined to one of the pair of leads 71 from a pressure transducer 68, and the seventh conductor 25 is connected to the other transducer lead 71. The transducer 68 senses the sudden pressure increase in ambient liquid caused by firing of the airgun, and this transducer transmits a signal up to the well head through the conductors 25 connected to its leads 71 for letting the operators up near the well head know that the airgun has fired properly and also to indicate and record the exact instant of firing.

The individual electrical conductors 25 of cable 24 then pass through the annular shoulder 55 and enter into chamber B in the connector housing 14 filled with waterproof sealant 60 through a grease fitting 75 (see FIG. 7) which communicates with this sealant chamber B through a passageway 77 (FIG. 7). A connector support 70 encircles the solenoid valve terminals 67, 69 and has four of the conductors 25 connected therein to the solenoid valve 22 in the lower connector housing 16. The transducer leads 71 pass through an insulating washer 72 and are sealed in the connector housing 14 by sealing screw 74.

Figure 5:
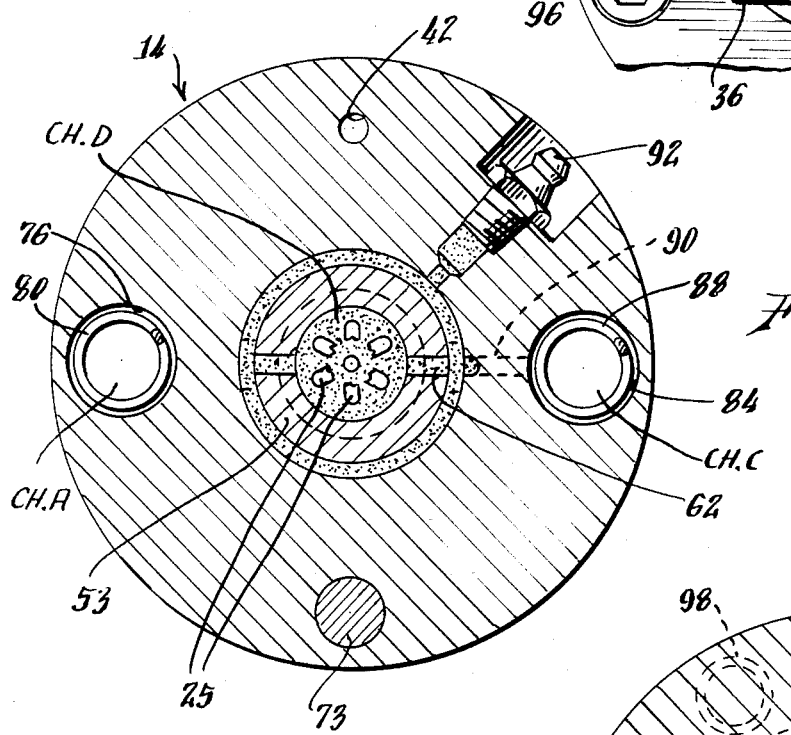
FIG. 5 is a cross-sectional view taken along line 5—5 of FIG. 3, shown enlarged.
Figure 6:
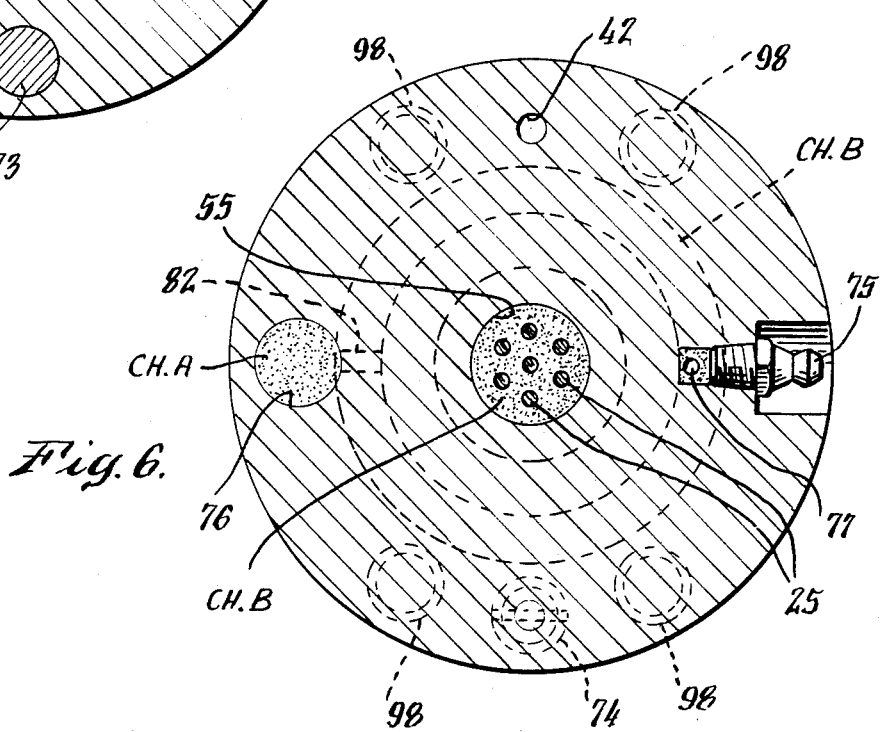
FIG. 6 is a cross-sectional view taken along line 6—6 of FIG. 3.

As best seen in FIG. 7, the intermediate connector housing 14 is provided with a first cylinder space 76 carrying an axially movable piston 78 for movement therein and acted upon by a force-applying means in the form of a spring 80. This first cylinder space 76 (which is also called chamber "A") communicates with the ambient liquid surrounding the connector housing 14 through a PORT 1 on the upper end thereof. An inner end of the piston 78 applies pressure to fluid sealant 60 in this chamber A, and this chamber A communicates with chamber B through a passageway 82 (FIG. 7). A second cylinder space 84 (which is also called chamber C) is diametrically located from said first cylinder space 76 in the housing 14 and carries an axially movable piston 86 therein. This second piston 86 has a force applied thereto by a spring 88, and this piston applies the spring-loaded force to fluid sealant 60 in the chamber filled with waterproof sealant which is in communication with chamber D through passageways 90 and 62. The second cylinder space 84 communicates with ambient liquid through a PORT 2 on the upper end of the housing 14. Accordingly, ambient liquid pressure is applied through the respective PORTS 1 and 2 to each of the pistons 78 and 86 together with the continuous force resultant from the axial thrust supplied by the respective springs 80 and 88. A grease fitting 92 is provided for supplying sealant 60 through a passage 94 and passage 62 into chamber D and through passageway 90 to chamber C as illustrated in FIG. 5. The other grease fitting 75 previously described feeds waterproof sealant through passage 77 (FIG. 7) to chamber B and through passageway 82 (FIG. 7) into chamber A as shown in FIG. 7.

In operation, the connector assembly 10 is assembled with the individual conductors 25 of the electrical cable 24 connected to the terminals 67, 69 for the solenoid valve 22 and connected to the leads 71 of the transducer 68, thereby providing all of the connections which are desired to be made. Waterproof sealant 60 is then supplied through the grease fittings 75 and 92 to fill the chambers A, B, C and D with waterproof sealant material. This filling action of the fluid sealant 60 pushes the respective pistons 78 and 86 away from the inner ends of their respective cylinders 76 (chamber A) and 84 (chamber C), thereby compressing the respective springs 80 and 88 for causing these springs to exert continuous forces on the fluid sealant in the inner ends of chambers A and C. The pistons 78 and 86 being spring-loaded by springs 80 and 88, respectively, exert an initial constant predetermined first pressure P1 on the waterproof sealant 60 in chamber A and in chamber C, respectively, along with an additional variable ambient pressure P2 which enters through the PORTS 1 and 2 and which depends at any given moment upon the depth of the connector assembly 10 below the surface of the liquid in the well and depends upon the density (specific gravity) of this liquid in the well.

Consequently, the sealant 60 in communicating chambers A and B is subjected to the advantageous additive resultant of the variable ambient liquid pressure P2 plus the predetermined pressure $P1_{80}$ produced by the axial thrust of the spring 80.

This pressure $P_{A+B}$ in chambers A and B can be expressed as:

$$P_{A\&B} = P1_{80} + P2 \quad (1)$$

Therefore, the sealant 60 in chambers A and B will be maintained at pressure $P_{A\&B}$ which is always at the predetermined pressure difference $P1_{80}$ above the variable ambient liquid pressure P2.

Similarly, the sealant 60 in communicating chambers C and D is subjected to the advantageous additive resultant of the variable ambient liquid pressure P2 plus the predetermined pressure $P1_{88}$ produced by the axial thrust of the spring 88 (which may be the same as or different from the thrust of the spring 80). This pressure $P_{C\&D}$ in chambers C and D can be expressed as:

$$P_{C\&D} = P1_{88} + P2 \quad (2)$$

Therefore, the sealant 60 in chambers C and D will be maintained at pressure $P_{C\&D}$ which is always at the predetermined pressure difference $P1_{88}$ above the variable ambient liquid pressure P2.

Since this fluid sealant 60 is always at a pressure level exceeding ambient pressure by a predetermined amount, this fluid sealant resists the leakage or seepage of ambient liquid into the fluid sealant chambers B and D which enclose the terminal connections 67, 69 and adjacent portions of the conductors 25 connected thereto. As the airgun 20 is lowered into a borehole and the ambient liquid pressure increases, the additional spring-loaded pressure P1 continues to act on the sealant 60 surrounding the connections and conductors, thus advantageously preventing external liquid or gases in the borehole liquid from entering into these connector areas.

In summary, the sealant 60 in chambers A and B is always sujected to a pressure greater, (for example in the range from 0.20 to 10 pounds per square inch greater) than ambient liquid because the force of the spring 80 is always added to the ambient pressure which is applied to the piston 78 through PORT 1. Similarly, the sealant in chambers C and D is always subjected to a pressure greater (for example, in the range from 5 to 80 pounds per square inch greater) than ambient liquid because the force of spring 88 is always added to the ambient pressure which is applied to the piston 86 through PORT 2.

The upper housing 12 is readily assembled to the intermediate housing 14 by machine screws 96 and their joint is sealed by O-rings (FIG. 8) described above. Similarly, the lower housing 16 is readily assembled to the intermediate housing 14 by machine screws 98, and their joint is sealed by O-rings 100 (FIGS. 7 and 8). The connector support 70 is sealed to the wall of chamber B by an O-ring 102 (FIG. 8). The connector support 70 and intermediate housing 14 are oriented with respect to each other by a locator pin 104 so that the respective conductors 25 are not inadvertently twisted during assembly of the whole cable connector 10.

The cable 24 is intended to suspend the entire weight of the airgun 20, the solenoid valve 22 and the cable connector 10. Thus, this cable, for example a "Logging Cable", contains at least one longitudinally extending stress-bearing member. For example, in this embodiment each of the seven conductors 25 is a multiple-strand flexible conductor. The exterior sheath 57 of the cable 24 comprises two layers of armor-like steel strands having opposite helical lay. It is the multiple steel strands in the sheath 57 which have suitable tensile strength for supporting the entire weight of the connector assembly, 10, airgun 20 and solenoid valve 22 plus the accumulated weight of hundreds or even thousands of feet of the cable 24 itself when suspended down in a borehole or well in the earth. Therefore, the cable clamp 26 itself is designed for providing a very strong grip on the cable 24 and a strong connection onto the upper end portion 31 of the upper housing 12 of the cable connector assembly 10. This connector assembly 10 may be used with other types of waterproof electrical cable 24.

Inviting attention back to the two pistons 78 and 86 (FIG. 7) and their respective springs 80 and 88, it will be noted that these pistons have relatively long cylindrical sleeve skirts 106 and 108, respectively, integral with their heads 78 and 86. The compression springs seat against the piston heads and are received within the hollow interiors of the piston skirts 106, 108. This telescoping arrangement of the compression springs within the piston skirts enables relatively long springs to be employed for providing relatively long piston travel in a compact space. The long piston travel maintains pressure on the fluid sealant 60 for continuing reliable operation even if the chamber A or C happens to become only partially filled with sealant, due to some inadvertent leakage of sealant out of the connector 10.

This connector assembly 10 may be used to advantage deep within any body of water, for example deep within an ocean, where high ambient liquid pressure exists.

Since other changes and modifications varied to fit particular operating requirements and enviroments will be apparent to those skilled in the art, the invention is not considered limited to the examples chosen for purposes of illustration, and includes all changes and modifications which do not constitute a departure from the true spirit and scope of this invention as claimed in the following claims and equivalents thereto.

What is claimed is:

1. A high-ambient liquid-pressure-resistant electrical connector which is resistant to high pressure in ambient liquids for use with an impulse energy source having a solenoid-actuated valve mounted on the impulse energy source for protecting from such ambient liquid a multiconductor electrical cable having a plurality of electrical conductors respectively connected to a plurality of terminals of said solenoid valve, said high-ambient-liquid-pressure-resistant electrical connector comprising:
    a connector housing having a lower end and an upperend;
    mounting means for securing said lower end of said connector housing to said impulse source;
    cable clamp means associated with said upper end of said connector housing for encircling said electrical cable near an end of said cable from which end extend a plurality of electrical conductors attached to respective terminals of said solenoid valve;
    said cable clamp means including gripping means for providing a mechanical grip on an electrical cable encircled by said clamp means;
    said connector housing defining a fluid-sealant chamber for enclosing said electrical terminals and adjacent portions of the respective conductors connected to said terminals;
    said connector housing including at least one barrier means for engaging the cable and being positioned between said first fluid-sealant chamber and said cable clamp means;
    said barrier means engaging the cable for providing a barrier against ambient liquid seeping past said barrier toward said electrical terminals;
    said connector housing defining a cylinder space having an inner end communicating with said fluid-sealant chamber;
    said cylinder space having an outer end;
    a movable piston in said cylinder space positioned between the outer and inner ends of said cylinder space;
    said connector housing having a port directly exposed to the ambient liquid exterior of said connector housing and communicating with said outer end of said cylinder space for applying ambient pressure to said piston urging said piston away from said outer end of said cylinder space and toward said inner end;
    force applying means coupled to said piston for applying continuous force urging said piston toward said inner end of said cylinder space for causing said piston to be urged toward said inner end with pressure due to ambient pressure plus pressure resulting from said continuous force; and
    filling means communicating with said fluid-sealant chamber and with said inner end of said cylinder space for filling said fluid-sealant chamber and said inner end of said cylinder space with water-proof fluid sealant under ambient pressure plus additional pressure resulting from said continuous force for enabling said fluid-sealant under said additional pressure to resist seepage of ambient liquid into said fluid-sealant chamber enclosing said terminals and adjacent portions of the respective conductors connected thereto.

2. The electrical connector as claimed in claim 1 wherein said connector housing has an air supply passage for feeding pressurized gas through said connector housing past the solenoid valve to said impulse source.

3. The electrical connector as claimed in claim 1, wherein said housing has a second cylinder space with inner and outer ends carrying a second movable piston therein between said inner and outer ends and a second force applying means coupled to said piston for applying continuous force urging said piston toward said inner end, said second cylinder space having a second port communicating directly with ambient and said outer end of said second cylinder space for applying ambient pressure to said piston, a second fluid-sealant chamber surrounding said cable positioned in said housing in front of said fluid sealant chamber enclosing said electrical connections, said inner end of said second cylinder space communicating with said second fluid-sealant chamber, second filling means communicating with said second fluid-sealant chamber and with the inner end of said second cylinder space for filling said second fluid-chamber and the inner end of said second cylinder space with water-proof fluid-sealant, said second piston applying a continuous force from said second force means and from ambient pressure acting through said second port for maintaining the pressure of the fluid sealant in said inner end of said second cylinder space and in said second chamber above the ambient liquid pressure for inhibiting ambient liquid seepage into said second liquid-sealant chamber surrounding said electrical conductors of said cable.

4. A high-ambient-liquid-pressure-resistant connector assembly for connecting a plurality of conductors in an electrical cable having a cable sheath to a plurality of electrical terminals of apparatus which is subjected to high ambient liquid pressure in an environment into which the connector assembly and apparatus are lowered comprising:
    a connector housing having an upper and a lower end;
    means for mounting said apparatus on said lower end;
    clamping means on said upper end of said connector housing for clamping onto said sheath of said electrical cable and having said plurality of conductors extending from an end portion of the cable sheath into said housing from the clamped cable;
    a first fluid-sealant chamber in said connector housing for enclosing said electrical terminals and the adjacent portions of the conductors which are connected to said terminals;
    a first cylinder having an inner end communicating with said first fluid-sealant chamber and an outer end communicating with a first port in said housing exposed directly to the ambient liquid surrounding said housing;

first sealant filling means in said housing communicating with said first fluid-sealant chamber and with the inner end of said first cylinder for filling said first fluid-sealant chamber and the inner end of said first cylinder with water-proof fluid sealant; and a first movable piston and first spring means in said first cylinder for urging said piston toward said inner end of said first cylinder, thereby applying ambient pressure plus spring pressure on said water-proof fluid sealant in said fluid-sealant chamber thereby inhibiting the entrance or seepage of ambient liquid into said fluid-sealant chamber enclosing said terminals and conductors.

5. The connector assembly as claimed in claim 4, wherein said connector housing has a first barrier means encircling and squeezing said cable sheath for providing a barrier against ambient liquid seeping longitudinally within the cable sheath into said connector housing past said barrier means.

6. The connector assembly as claimed in claim 4, wherein said connector housing has a second fluid-sealant chamber surrounding and enclosing the end portion of the cable sheath and the plurality of conductors extending from said end portion of said cable sheath at a location spaced from their connection to said terminals in said first fluid-sealant chamber;

a second cylinder in said housing having an inner end and an outer end;

a second movable piston and second spring means in said second cylinder for urging said second piston toward said inner end of said second cylinder;

second sealant filling means in said connector housing communicating with said second fluid-sealant chamber and with the inner end of said second cylinder for filling said second fluid-sealant chamber and the inner end of said second cylinder with water-proof fluid sealant; and a second port in said connector housing communicating directly with ambient liquid and said outer end of said second cylinder for exposing said second piston to the ambient pressure surrounding said connector housing for said second piston to apply ambient pressure plus spring pressure on said water-proof fluid sealant in said second fluid-sealant chamber where said plurality of conductors extend from said end portion of said cable sheath, thereby inhibiting seepage or entrance of ambient liquid along within the cable sheath to enter said connector assembly.

7. The connector assembly as claimed in claim 6, having separator barrier means mounted between said first and second fluid-sealant chambers snuggly engaging said conductors between said first and second fluid-sealant chambers for providing a barrier against ambient liquid seeping past said separator barrier means toward said electrical terminals; and said first spring means and said first piston applying greater pressure than said second spring means and said second piston for providing greater pressure within said first fluid-sealant chamber than within said second fluid-sealant chamber for aiding said separator barrier means in resisting ambient liquid seepage past said separator barrier means towards said electrical terminals.

8. The connector assembly as claimed in claim 7, wherein said apparatus employs pressurized gas and said connector housing has an air supply passage for feeding pressurized gas through said connector housing past said terminals to said apparatus.

9. The method of inhibiting ambient fluids under high pressures from entering a cable connector which provides electrical connections between a plurality of electrical conductors extending from an end portion of the sheath of an electric cable and electrical apparatus for use within any liquid of high ambient pressure comprising the steps of:

clamping the cable connector onto the sheath of the cable near said end portion for obtaining a mechanical grip by the connector onto the cable near said end portion of the sheath;

providing a first chamber in said connector surrounding said electrical connections;

filling the first chamber with water-proof fluid sealant for enclosing and embedding the electrical connections in said water-proof fluid sealant;

applying ambient pressure surrounding said connector onto said fluid sealant in said chamber for subjecting said fluid sealant to ambient pressure;

also applying a continuous additional pressure onto said water-proof sealant in said chamber for subjecting said fluid sealant in said chamber to ambient pressure plus said continuous predetermined additional pressure for causing the total pressure of said fluid sealant in said first chamber always to exceed ambient pressure by the amount of said continuous predetermined additional pressure for inhibiting the entrance of ambient fluids onto said chamber for preventing disruption of the electrical connections therein, providing a second fluid-sealant chamber in said connector surrounding the end portion of said cable sheath and the electrical conductors near said end portion;

snuggly embracing the electrical conductors with a barrier positioned between said first and second fluid sealant chamber for isolating said chambers from each other;

filling the second chamber with water-proof sealant for enclosing and embedding said end portion of the cable sheath and the conductors extending therefrom near said end portion in water-proof fluid sealant; and applying ambient pressure surrounding said connector plus a continuous additional pressure onto the fluid sealant in said second chamber or subjecting said fluid sealant in said second chamber to ambient pressure plus said continuous additional pressure for causing the total pressure of said fluid sealant in said second chamber always to exceed ambient pressure by the amount of said continuous additional pressure for inhibiting the entrance of ambient fluids into said connector through said end portion of said cable sheath.

10. The connector assembly as claimed in claim 4, in which:

said first piston has a piston head with a sleeve-like skirt connected to said piston head and extending toward said outer end of said first cylinder; and said first spring means is a compression spring extending at least partially within said skirt.

11. The connector assembly as claimed in claim 6, in which:

said first and second pistons each comprises a piston head with a skirt connected to the respective head and extending toward the respective outer end of said first and second cylinders; and said first and second spring means each comprises a compression spring extending at least partially within the skirt of the respective piston.

12. The method of inhibiting the entrance of ambient fluids as claimed in claim 9, including the further step of:

applying a greater continuous additional pressure onto said sealant in said first chamber surrounding said electrical connections than the additional pressure being applied onto said sealant in said second chamber surrounding said end portion of said cable sheath and the electrical conductors near said end portion for providing a greater sealant pressure in said first chamber for aiding said barrier in inhibiting the seepage of ambient fluids past said barrier toward said electrical connections.

* * * * *